Dec. 13, 1960
L. H. GEYER
2,964,059
PRESSURE-FLOW SERVO VALVE
Filed March 5, 1959
2 Sheets-Sheet 2
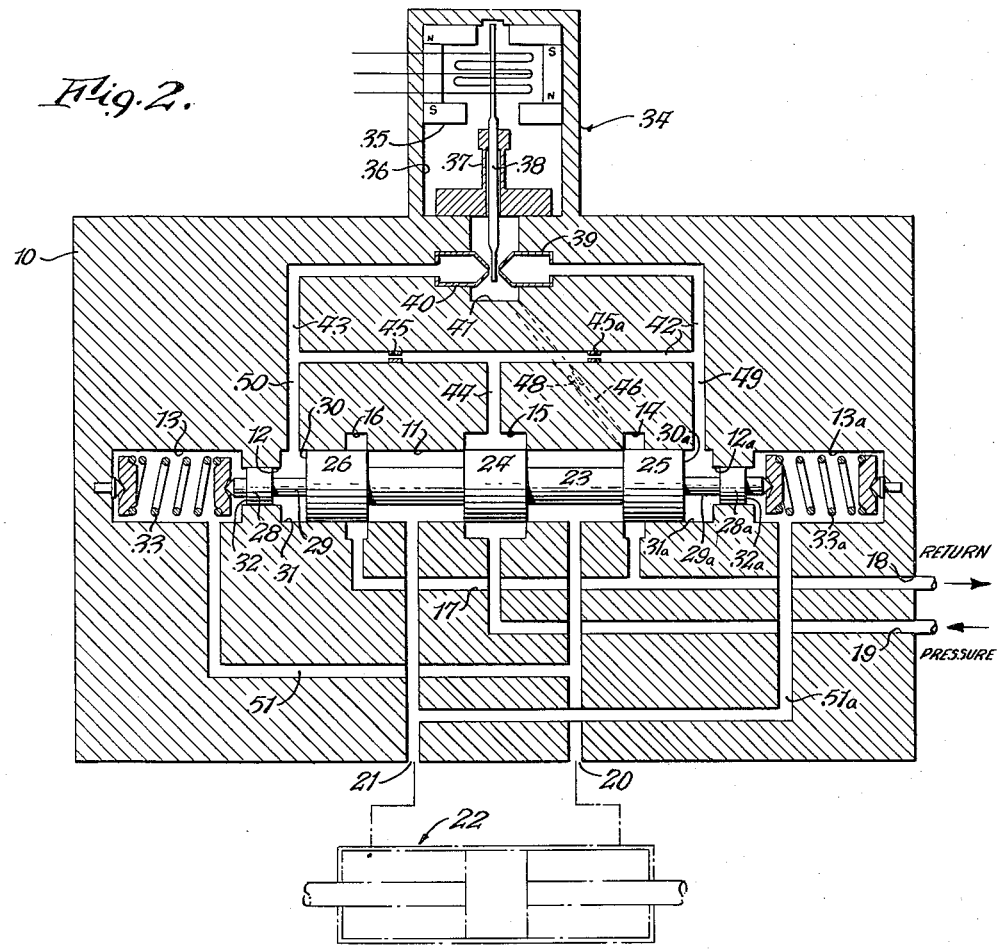
INVENTOR.
Lewis H. Geyer
BY
Popp and Sommer
Attorneys.

United States Patent Office 2,964,059
Patented Dec. 13, 1960

2,964,059

PRESSURE-FLOW SERVO VALVE

Lewis H. Geyer, East Aurora, N.Y., assignor to Moog Valve Co. Inc., East Aurora, N.Y., a corporation of New York Filed Mar. 5, 1959, Ser. No. 797,488

4 Claims. (Cl. 137—623)

This invention relates to improvements in electrically operated, fluid handling, servo valves.

In a conventional position closed-loop control system, servo valve flow is applied to a hydraulic piston or motor, driving a load. Load position is measured electrically and fed back for comparison with a signal representing the desired position. Resulting error signal is amplified, providing a current input to the servo valve to control flow. For many applications, it is satisfactory to employ a flow control valve which produces an output flow rate proportionate solely to the error signal input such as disclosed in U.S. Patent No. 2,767,689. However, if the load has a high inertia, as would be provided by relatively large masses to be moved, the load may be considered as a mass which is coupled to the drive piston by members having compliance. Such compliance is due to the drive linkages, the mounting supports, the fluid compressibility, the elasticity of the cylinder walls and fluid lines. As a result, the load following a disturbance tends to resonate as if on a spring, the amount of damping being small. In most situations, the only load damping present is from frictional drags of support bearings or the like and these drags are generally kept as low as possible. If the drive system to the load could be made completely rigid, then no finite resonance would be possible. In real systems, however, infinite stiffness cannot be achieved. The stiffnesses due to oil compressibility, structural deformation and the drive mechanism all contribute to the resonance problem.

The improved servo valve of the present invention has particular application in a resonant-loaded closed-loop system to position an actuator, whether a piston or fluid motor, which in turn drives a relatively large mass through an elastic coupling, in effect, which may be designated as drive stiffness. Examples of loads which provide such resonance include rocket engines, press brakes, tracking antenna, etc.

It is accordingly the primary object of the present invention to provide an improved electrically operated, fluid handling, servo valve which contributes effective damping in dynamically loaded servo systems, an attribute lacking in the flow control valve disclosed in said patent. This is accomplished by controlling valve spool displacement jointly by the electrical signal input and by the reaction of the load with which the valve is associated. Thus, as the load reaction increases, flow through the valve decreases, and vice versa. Since the improved valve has a combination of the functions of flow and pressure control, it is herein referred to as a pressure-flow servo valve.

Another object is to provide such a pressure-flow servo valve wherein true load pressure is sensed.

A further object is to provide such a pressure-flow servo valve by a construction which inherently lends itself to the design of specific valves having the precise damping characteristics desired by varying the properties and proportions of certain elements of the valve.

Other objects and advantages will be apparent from the following detailed description and accompanying drawings in which:

Fig. 2 is a vertical central sectional view through a pressure-flow electrohydraulic servo valve embodying the present invention and illustrating the internal construction of the valve in a more or less diagrammatic manner and with the valve spool in a neutral position.

Fig. 3 is a typical load flow versus load pressure curve for the improved valve.

Figure 1:
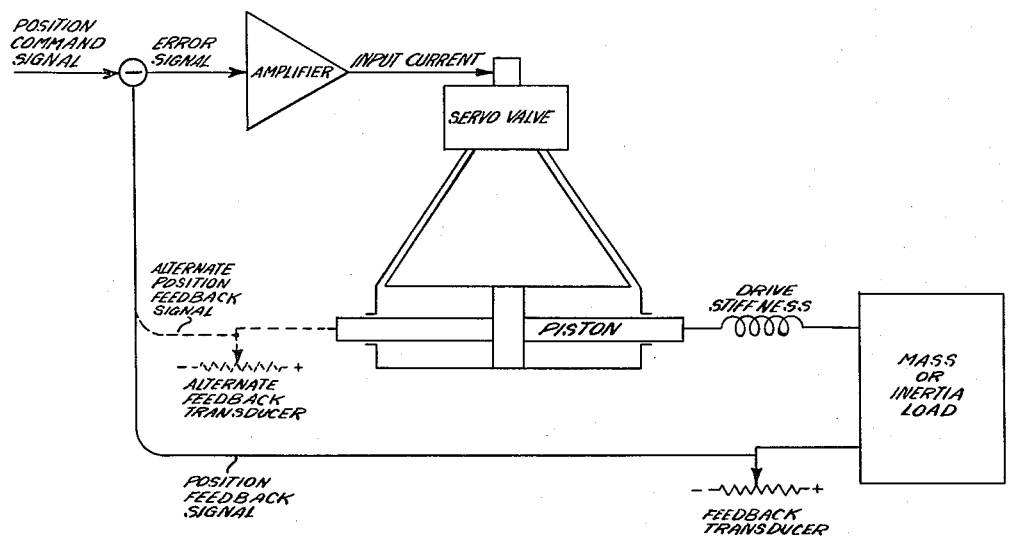
Fig. 1 is a schematic of a closed-loop control system including a servo valve and a large mass or inertia load and wherein a resonance exists between the mass and the driving stiffnesses.

Referring to Fig. 1, a resonant-loaded positional servo mechanism is schematically illustrated therein. In this illustrated system, the servo valve controls flow to the piston which in turn through drive stiffness moves a mass or inertia load. The position of the load is measured electrically by a feedback transducer which determines a position feedback signal which is fed back for comparison with a position command signal. The resulting error signal is amplified, providing current input to the servo valve to control flow. Instead of having position feedback from the load member which might be in a remote location and therefore not too accessible, position feedback may be taken from the piston, as in most cases there is significant compliance associated with the drive fluid. Such an alternate feedback arrangement from the servo piston is also illustrated in Fig. 1 but by broken lines.

The pressure-flow servo valve of the present invention provides effective damping in a dynamically loaded servo system such as schematically illustrated in Fig. 1. This is achieved by positioning the spool of the servo valve in response jointly to the electrical signal input and by the reaction of the load as will be hereinafter explained.

Considering now the construction of the valve itself, the same is shown in Fig. 2 as having a body 10 internally formed with a horizontally elongated central chamber 11 connected at opposite ends severally through reduced bores 12, 12a with end chambers 13, 13a, respectively. All of these chambers and the intermediate reduced bores are cylindrical and coaxial and jointly provide a primary chamber. The body wall of the central chamber 11 is shown as provided with three annular grooves 14, 15 and 16 at axially spaced intervals therealong. The right groove 14 is shown as communicating with a return or drain port 18 and the left groove 16 via a fluid channel 17 is also shown as communicating with the drain port 18. The center groove 15, somewhat longer axially than the other two, is shown as communicating with a pressure port 19. The portion of the central chamber 11 between the grooves 14 and 15 is shown as being in communication with an actuating port 20. The portion of the central chamber 11 between the grooves 15 and 16 is shown as being in communication with a second actuating port 21.

The return port 18 and pressure port 19 are connected with any suitable hydraulic system (not shown). The actuating ports 20 and 21 are connected with external hydraulic machinery indicated schematically as a piston and cylinder actuator and represented by the numeral 22.

Thus, the servo valve has inlet, outlet and actuating ports for supplying and receiving fluid to and from the actuator 22 to be actuated.

A valve spool 23 is slidably arranged in the central chamber 11 and is shown as having a central lobe 24 and two end lobes 25 and 26. The central lobe 24 has an axial length corresponding to that of the central groove 15. The end lobes 25 and 26 are longer axially than the width of the end grooves 14 and 16. When the valve spool 23 is in its centered or neutral position shown in Fig. 1, the central lobe 24 covers the center groove 15, and the end lobes 25 and 26 cover the end grooves 14 and 16, respectively, with the inner ends of these end lobes opposite the inner ends of these end grooves. In this centered or neutral position of the valve spool 23, neither actuating port 20 or 21 has communication with either the pressure port 19 or the drain port 18.

Similar piston heads 28 and 28a are shown severally as being slidably arranged in the intermediate reduced bores 12 and 12a, respectively. These piston heads are arranged at opposite ends of the valve spool and are axially spaced outwardly therefrom. Each piston head is shown as being integrally connected to the corresponding end of the valve spool 23 by a stem, such stem being indicated at 29 for the piston head 28 and at 29a for the other piston head 28a. If desired, the pistons might be provided by stub shaft extensions of uniform diameters from the ends of the valve spool. The portion of the chamber 11 between the inner end face of the left piston head 28 and the outer end face 30 of the left end lobe 26 provides an inner secondary chamber 31 shown as a hydraulic drive chamber. A similar inner secondary or drive chamber 31a, is provided between the inner end face of the right piston head 28a and the outer end face 30a of the right end lobe 25. The inner end of the left end chamber 13 is closed by the outer end face 32 of the left piston head 28, to provide an outer secondary chamber, and similarly the inner end of the right end chamber 13a is closed by the outer end face 32a of the right piston head 28a to provide an outer secondary chamber.

A helical compression spring 33 is shown arranged in the left end chamber 13 and suitably operatively interposed between the fixed outer end wall of this chamber and the outer end face 32 of the movable left piston head 28. A similar spring 33a is shown as arranged in the right end chamber 13a and between the fixed outer wall thereof and the outer end face 32a of the movable right piston head 28a.

Means are provided for producing a pressure differential in the spool drive chambers 31 and 31a so as to drive the spool 23 hydraulically. Such means are shown as including an electrohydraulic amplifier first stage, represented generally by the numeral 34, which produces an output pressure differential proportionate to an electrical signal input.

The preferred electrohydraulic amplifier 34 is shown as having a solenoid or torque motor 35 arranged in a compartment 36 in the valve body, and adapted to move a pressure regulator member 38. A pair of nozzles 39 and 40 are arranged in a separate compartment 41 which serves as a sump chamber. The end portion of the pressure regulator member 38 remote from the torque motor 35 extends between the discharge openings of the nozzles 39 and 40 and in a variably spaced relation thereto. The pressure regulator member 38 intermediate its ends is mounted on a flexure tube 37. The position of the lower or flapper portion of the pressure regulator member with respect to the discharge openings of the nozzles 39 and 40, provides variable annular orifices which develop a pressure differential within the nozzle chambers or interiors.

It will be observed that the solenoid or torque motor 35 is isolated from the sump chamber 41 into which the nozzles 39 and 40 discharge fluid. Such a dry solenoid type of electrohydraulic amplifier is more fully described as to construction and operation in the patent application of William C. Moog, Jr., Serial No. 560,573, filed January 23, 1956, and entitled Fluid Control Valve in Which a Mechanical Motion Is Transmitted From a Dry Region to a Pressurized Fluid Filled Region. Instead of the preferred dry solenoid type of first stage amplifier shown, an immersed solenoid type may be employed such as is fully described in the aforementioned Patent No. 2,767,689. Both such types of electrohydraulic amplifiers are of the balanced nozzle design and regardless of which type is employed in the practice of the present invention, provide an output pressure differential proportionate to the electrical signal input to the solenoid or torque motor 35. Such hydraulic amplifiers provide a high force level output push-pull hydraulic drive with completely frictionless operation and excellent dynamic performance while requiring a very little signal input current.

Suffice it to say here that the construction of each of the aforementioned electrohydraulic amplifiers comprises a polarized electrical force motor including spaced pole pieces, permanent magnet means and electromagnetic means associated with the pole pieces, and having for its armature and extending between the pole pieces a flapper means arranged to move with mechanical spring restraint, the centering force gradient of which is substantially cancelled by the decentering force gradient of the permanent magnet means, and a pair of fixed nozzles in spaced relation to different surface portions of the flapper to provide variable orifices for discharging fluid, variations in the position of the flapper relative to the nozzles resulting in a differential pressure between the nozzle chambers, the flapper moving to reduce to zero the summation of the moments acting upon it.

Means are provided for supplying the electrohydraulic amplifier 34 with fluid derived from the hydraulic system connected to the pressure return ports 19 and 18, respectively. As shown, the fluid feed is by means of independent branch fluid feed channels 42 and 43 severally communicating at one end with the chambers or interiors of the nozzles 39 and 40, respectively. At their other ends the channels 42 and 43 communicate with a main fluid feed channel 44 which leads to the annular pressure groove 15, in turn connected to the pressure port 19. The channels 43 and 42 are shown severally as having restrictions 45 and 45a, respectively, therein so that fluid supplied to the nozzles is at a lower pressure than the hydraulic system supply pressure applied to the port 19. A fluid drain channel 46 having a restriction 48 therein is shown as placing the sump chamber 41 in communication with the annular drain groove 14, in turn connected to the return port 18.

Means are shown for applying the pressure differential created by the nozzles 39 and 40 to the spool drive chambers 31 and 31a so that this pressure differential can be utilized to drive hydraulically the valve spool 23. Such means are shown as including fluid channels 49 and 50. The channel 49 at one end communicates with the fluid feed branch channel 42 on the downstream side of the restriction 45a therein, and the opposite end of the channel 49 communicates with the right spool drive chamber 31a. The fluid channel 50 is shown as communicating with the fluid feed branch channel 43 on the downstream side of the restriction 45 therein, and the other end of this channel 50 communicates with the left drive chamber 31. Thus, the respective output pressures developed by the nozzles 39 and 40 are applied severally to the end faces 30a and 30, respectively, at opposite ends of the valve spool 23.

Means are provided for feeding back the pressures in the actuating ports 20 and 21 to the valve spool 23 in such manner that the pressure differential across the load is in opposition to the hydraulic drive on the valve spool due to the pressure differential in the drive chambers 31 and 31a. As shown, this is accomplished by providing feedback channels 51 and 51a in the valve body 10. One end of the channel 51 communicates with the left spool end chamber 13 and its other end with the passage leading from the right actuating port 20 to the annular space between the lobes 24 and 25 of the valve spool 23. One end of the channel 51a communicates with the right spool end chamber 13a and its other end with the passage leading from the left actuating port 21 to the annular space between the lobes 24 and 26 of the valve spool 23.

It is important that the feedback channels 51 and 51a communicate with the actuating ports 20 and 21 adjacent the same, i.e., remote from the annular spaces around the valve spool 23 intermediate the aforementioned pairs of lobes. This is for the reason that it is desired, and the construction illustrated and described achieves it, to sense the true load pressure differential in the load lines rather than sense a turbulent pressure at a place close to the valve spool, as would be the case if the feedback channels were formed in the valve spool itself extending from the spring end chamber 13 or 13a to the annular space between the center lobe 24 and the corresponding end lobe 26 or 25.

Thus, the spool end chamber 13 and actuating port 20 have the same pressure, and the other spool end chamber 13a and other actuating port 21 have the same pressure.

It is pointed out that the piston head end faces 32 and 32a are of equal area, as are the spool end faces 30 and 30a, although the faces 30, 30a are shown as larger in area than the faces 32, 32a. The ratio of the area 30 to the area 32 is equal to the ratio of the amplifier output pressure produced in the drive chamber 31 to the output pressure in the related actuating port 20. These same ratios apply at the opposite end of the valve spool, as related to the other actuating port 21.

It is to be noted that the ratio of the areas of the spool end faces 30, 30a on the one hand, and the piston head end faces 32, 32a on the other hand, may be designed as desired in order to produce the specific ratio of the pressure differential to be developed in the actuating ports 20 and 21 with respect to the pressure differential established in the nozzle chambers 39 and 40 in response to a given electrical input signal.

Several forces act on the valve spool 23. Ignoring flow reaction forces, one is the command pressure, being the pressure differential acting on the spool end faces 30 and 30a and proportionate to the electrical input signal to the electrohydraulic amplifier first stage 34. A second force consists of the spring forces applied by the spool end springs 33 and 33a. A third force is the load differential pressure applied to piston head end faces 32 and 32a. The first force is opposed by the second and third forces. It will be seen that for every command input, the valve spool 23 moves until the summation of the above forces equals zero.

The effect is graphically depicted in Fig. 3 which is a curve resulting from a plot of load pressure differential ($P_L$) against fluid flow ($Q_L$) toward the load as permitted by valve spool displacement, for a given command signal. A substantially linear relationship exists whereby load flow decreases as load reaction increases and vice versa.

By selecting the spool end areas 30, 30a, piston head areas 32, 32a and the spring rate of the spool end springs 33, 33a, a valve can be designed for a particular use application having the slope of curve desired and determined by $$\frac{Q_L}{P_L}$$

Once the slope of curve is decided upon, the valve will operate on the curve for a given electrical input.

When there is no electrical input signal to the hydraulic amplifier first stage 35, the output pressures in the nozzle chambers 39 and 40 will be the same and the valve spool will assume its neutral position shown in Fig. 1, provided there is no pressure drop across the load created by the actuator 22, in which case the pressure of the fluid in the actuating ports 20 and 21 will likewise be the same.

Assume now that an electrical input signal is applied so as to induce a pressure differential in the nozzle chambers 39 and 40 with the pressure in chamber 39 being higher than that in chamber 40. The pressure differential establishes a higher pressure in the right drive chamber 31a than in the left drive chamber 31 and disturbs the force balance on the valve spool 23 so that the valve spool is driven to the left. In doing so, it will be seen that the lobe 24 partially uncovers the annular pressure groove 15 so as to establish communication between this groove and the actuating port 20. It will also be noted that the left lobe 26 has moved so as to uncover partially the left annular return groove 16 and thereby establish communication between this groove and the other actuating port 21.

Inasmuch as this shift of the valve spool produces a flow from the pressure port 19, through groove 15 into the annular space between the lobes 24 and 25, from which space fluid can flow through the actuating port 20 into the actuator 22 on the right side of the piston thereof, a certain pressure will be produced in the actuating port or load line 20. This same pressure is fed back through channel 51 to the left spool end chamber 13. The other or left side of the piston of the actuator 22 is connected through the actuating port or load line 21, the annular space between the lobes 24 and 26, the left annular groove 16, channel 17, to the drain port 18. The pressure in this load line 21 is transmitted to the right end chamber 13a through the feedback channel 51a. Thus it will be seen that the pressures in actuating ports 20 and 21 are communicated to the piston head end faces 32 and 32a, respectively, so that the difference between these pressures produces a force on the valve spool 23 which force is in opposition to that developed by the driving pressures acting on the spool end faces 30 and 30a.

As well, valve spool displacement is being opposed by the spool end springs 33 and 33a. Inasmuch as fluid flow and hence time is required to build up a pressure differential in the load lines 20 and 21, the initial opposition to displacement of the valve spool is produced by the springs. Therefore, valve spool displacement is greatest initially. However, as the pressure differential across the load builds up and is applied to the spool end faces 32 and 32a, the result is that the feedback pressures gradually relieve the springs 33 and 33a thereby causing the valve spool to shift to the right. In doing so the valve spool lobes 26 and 24 gradually reclose the grooves 16 and 15, respectively, whereby flow through these grooves decreases as the pressure differential across the load increases to that commanded by the electrical signal input, as indicated by the curve of Fig. 3. At all times the valve spool 23 seeks a position in which the driving force on the spool equals the sum of the opposing forces made up of the spring force and the feedback force.

Assuming now that the electrical input signal is so varied that the pressure differential in the nozzle chambers 39 and 40 changes with the result that the pressure in the left nozzle increases and the pressure in the right nozzle chamber decreases, the following occurs. The valve spool 23 shifts to the right, following the decrease in pressure in the right drive chamber 31a and increase in pressure in the left drive chamber 31. It will now be seen that the annular pressure groove 15 is uncovered by the center lobe 24 and placed in communication with the actuating port 21, the pressure therein being transmitted to the right end chamber 13a via the feedback channel 51a. At the same time, the right lobe 25 uncovers the right annular return groove 14 so as to place this groove in communication with the actuating port 20, the pressure therein being transmitted to the left end chamber 13 via the feedback channel 51. Thus the same condition explained above is created but only in a reversed relationship insofar as the actuating ports 20 and 21 are concerned.

Thus the functions of flow and pressure control combine to provide the present so-called pressure-flow servo valve characterized by having a flow proportionate to the algebraic sum of the command signal minus the load pressure drop.

It will be appreciated that with the pressure-flow servo valve operatively arranged in a resonant-loaded positional control system, when the valve receives an electrical command signal to change the position of the load the reaction of the load varies due to the drive stiffness or system compliance. This tends to produce a varying pressure differential across the actuating ports or load lines. When there is high initial resistance to movement of the load, the feedback force to the valve spool will almost equal the driving force and the valve spool will be displaced only slightly, thus reducing fluid flow from the valve. The case of a completely blocked load is represented at point X on the curve of Fig. 3. As load resistance decreases, the valve spool opens more and allows more flow. This might be compared to an orifice load and is represented at some intermediate point on the curve of Fig. 3 and such as Z. If the load offers no resistance to flow from the valve, the valve spool displaces the maximum permitted by the current input to the valve and this condition is illustrated at point Y on the curve of Fig. 3. Of course, as the load moves, the input current to the servo valve varies in accordance with the joint effect of the position command signal and the extent and sense of the position feedback signal.

From a complex analysis of a closed-loop control system wherein resonance exists between the load and the driving stiffness, it can be shown that damping is introduced into the overall servo system and that this damping is proportional to the slope of the pressure-flow characteristic curve of the valve such as typically illustrated in Fig. 3.

Suitable filtering means may, of course, be incorporated in the hydraulic circuit of the present pressure-flow electrohydraulic servo valve at various places in order to maintain the hydraulic fluid free of foreign material. Such filtering means have not been illustrated herein in order to confine the disclosure to the essentials of the valve.

In some cases, the output of the fluid amplifier first stage 34 is more conveniently fed to outer secondary chambers 13 and 13a and the load feedback to inner secondary chambers 31 and 31a, than as illustrated in the drawing. This is mostly a matter of design and manufacturing convenience.

The present invention is applicable to electrically operated servo valves handling not only hydraulic liquid but other fluids, such as compressed air or hot gases.

I claim:

1. In an electrically operated, fluid handling, pressure-flow servo valve, a chamber having inlet, outlet and actuating ports for supplying and receiving fluid to and from external fluid-operated machinery to be actuated, a valve spool slidably arranged in said chamber for controlling fluid flow through said ports, said spool having axially facing first areas at opposite ends thereof and also having axially facing second areas at opposite ends thereof, each of said second areas facing axially in the same direction as the corresponding one of said first areas, means for fluidly driving said spool including fluid amplifier means arranged to produce an output pressure differential proportionate to an electrical input signal to the valve and means arranged to apply said output pressure differential to said first areas, spring means arranged to yieldingly oppose movement of said spool, and means for applying to said second areas from said actuating ports a second pressure differential proportionate to said output pressure differential including means external of said spool for establishing communication severally between said actuating ports and second areas, whereby said spool moves for every command electrical input until the force developed by said output pressure differential is balanced by the sum of the force exerted by said spring means and the force developed by the pressure differential between said actuating ports as a result of load reaction.

2. In an electrically operated, fluid handling, pressure-flow servo valve, a chamber having axially spaced inlet, outlet and actuating ports for supplying and receiving fluid to and from external fluid-operated machinery to be actuated, a valve spool slidably arranged in said chamber and having lobes so positioned as to close said inlet and outlet ports when said spool is in a neutral position, said chamber adjacent each end having a portion of different diameter from the intermediate portion occupied by said spool, a piston connected to each end of said spool and extending axially outwardly therefrom and slidably arranged in the corresponding one of said different diametered portions, the portion of said chamber between each of said different diametered portions and the corresponding end of said spool providing a fluid driving chamber, the portion of said first mentioned chamber between each of said pistons and the corresponding end wall of said first mentioned chamber providing an end chamber, spring means arranged in each of said end chambers and operative to oppose movement of said spool, means for fluidly driving said spool including fluid amplifier means arranged to produce two output pressures having a difference in value proportionate to an electrical input signal to the valve and means arranged to apply said output pressures severally to said driving chambers, and means external of said spool for establishing communication severally between said actuating ports and end chambers, whereby said spool moves for every command electrical input until the force developed by the difference between said output pressures is balanced by the sum of the force exerted by said spring means and the feedback force developed by the pressure differential between said actuating ports as a result of load reaction.

3. In an electrically operated, fluid handling, pressure-flow servo valve, a valve body provided with a chamber having axially spaced inlet, outlet and first and second actuating ports for applying and receiving fluid to and from external fluid-operated machinery to be actuated, a valve spool slidably arranged in said chamber and having first and second end lobes and an intermediate lobe so positioned as to close said inlet and outlet ports when said spool is in a neutral position, said first actuating port communicating with that portion of said chamber between said first end lobe and said intermediate lobe and said second actuating port communicating with that portion of said chamber between said second end lobe and said intermediate lobe, said chamber adjacent each end having a portion of different diameter from the intermediate portion occupied by said spool, a first piston connected to that end of said spool having said first end lobe and extending axially outwardly therefrom and slidably arranged in the corresponding one of said different diametered portions, a second piston connected to that end of such spool having said second end lobe and extending axially outwardly therefrom and slidably arranged in the corresponding one of said different diametered portions, the portion of said chamber between each of said different diametered portions and the corresponding end of said spool providing a fluid driving chamber, the portion of said first mentioned chamber between each of said pistons and the corresponding end wall of said first mentioned chamber providing an end chamber, spring means arranged in each of said end chambers and operative to yieldingly oppose movement of said spool, means including fluid amplifier means arranged to produce and apply to said driving chambers a pressure differential proportionate to an electrical input signal to the valve, first feedback channel means in said valve body for establishing communication between said second actuating port and that one of said end chambers associated with said first piston, and second feedback channel means in said valve body for establishing communication between said first actuating port and the other of said and chambers associated with said second piston, whereby said spool moves for every command electrical input until the force developed by the command pressure differential is balanced by the sum of the force exerted by said spring means and the feedback force developed by the pressure differential between said actuating ports as a result of load reaction.

4. In an electrically operated, fluid handling, pressure-flow servo valve, a primary chamber having axially spaced inlet, outlet and actuating ports for supplying and receiving fluid to and from external fluid-operated machinery to be actuated, a valve spool slidably arranged in said primary chamber and having lobes so positioned as to close said inlet and outlet ports when said spool is in a neutral position, said primary chamber adjacent each end having a portion of different diameter from the intermediate portion occupied by said spool, a piston connected to each end of said spool and extending axially outwardly therefrom and slidably arranged in the corresponding one of said different diametered portions, the portion of said primary chamber between each of said different diametered portions and the corresponding end of said spool providing an inner secondary chamber, the portion of said primary chamber between each of said pistons and the corresponding end wall of said primary chamber providing an outer secondary chamber, spring means arranged to yieldingly oppose movement of said spool, means for fluidly driving said spool including fluid amplifier means arranged to produce two output pressures having a difference in value proportionate to an electrical input signal to the valve and means arranged to apply said output pressures severally to one similar pair of said secondary chambers, and means external of said spool for establishing communication severally between said actuating ports and the other similar pair of said secondary chambers, whereby said spool moves for every command electrical input until the force developed by the difference between said output pressures is balanced by the sum of the force exerted by said spring means and the feedback force developed by the pressure differential between said actuating ports as a result of load reaction.

References Cited in the file of this patent

UNITED STATES PATENTS

| | | |
|---|---|---|
| 2,210,917 | Kenyon | Aug. 13, 1940 |
| 2,345,531 | Ganahl | Mar. 28, 1944 |
| 2,709,421 | Avery | May 31, 1955 |
| 2,835,265 | Brandstadter | May 20, 1958 |
| 2,889,815 | Lloyd | June 9, 1959 |